(12) United States Patent
Wiker

(10) Patent No.: US 7,311,589 B2
(45) Date of Patent: Dec. 25, 2007

(54) ELECTRIC PORTABLE POWER TOOL WITH ROTATABLE GUARD

(75) Inventor: Juergen Wiker, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 412 days.

(21) Appl. No.: 10/521,061

(22) PCT Filed: Oct. 31, 2003

(86) PCT No.: PCT/DE03/03625

§ 371 (c)(1),
(2), (4) Date: Jan. 12, 2005

(87) PCT Pub. No.: WO2004/056529

PCT Pub. Date: Jul. 8, 2004

(65) Prior Publication Data

US 2006/0052041 A1 Mar. 9, 2006

(30) Foreign Application Priority Data

Dec. 19, 2002 (DE) ................................ 102 59 520

(51) Int. Cl.
*B24B 23/00* (2006.01)
(52) U.S. Cl. .................... 451/451; 451/454; 451/359
(58) Field of Classification Search ................ 451/451, 451/452, 455, 454, 457, 358, 359, 357, 344
See application file for complete search history.

(56) References Cited

U.S. PATENT DOCUMENTS

| 4,060,940 | A | * | 12/1977 | DeWitt ....................... 451/358 |
|---|---|---|---|---|
| 4,574,532 | A | * | 3/1986 | Haberle et al. ............. 451/451 |
| 4,791,541 | A | * | 12/1988 | Simmons .................... 362/376 |
| 5,005,321 | A | * | 4/1991 | Barth et al. ................. 451/359 |
| 5,163,252 | A | | 11/1992 | Garner et al. |
| 5,440,815 | A | * | 8/1995 | Inkster ........................ 30/390 |
| 5,766,062 | A | * | 6/1998 | Edling ........................ 451/451 |
| 6,464,573 | B1 | * | 10/2002 | Keller ......................... 451/451 |
| 6,669,544 | B1 | * | 12/2003 | Walz et al. .................. 451/454 |
| 6,699,114 | B1 | * | 3/2004 | Campbell et al. ........... 451/451 |
| 6,988,939 | B2 | * | 1/2006 | Hofmann et al. ........... 451/344 |
| 7,063,606 | B2 | * | 6/2006 | Stierle et al. ............... 451/359 |
| 2004/0014412 | A1 | | 1/2004 | Hofmann et al. |

FOREIGN PATENT DOCUMENTS

| DE | 199 14 855 A1 | 10/2000 |
|---|---|---|
| DE | 101 15 635 C1 | 10/2002 |
| DE | 101 24 439 A1 | 11/2002 |

\* cited by examiner

*Primary Examiner*—Eileen P. Morgan
(74) *Attorney, Agent, or Firm*—Michael J. Striker

(57) ABSTRACT

A manually operated electric machine tool for a disk-shaped rotating tool (18), having a machine housing (11) from which a drive spindle (12) for the tool (18) protrudes and on which a hollow cylindrical collar (15) is embodied coaxial to the drive spindle (12), and having a guard (20) that is detachably connected to the machine housing (11) and is designed to at least partially cover the tool (18), which guard can be mounted to and fixed in relation to the collar (15) by means of a clamp (23) with a clamping element (24). To set the guard (20) in desired rotation positions in relation to the machine housing (11) without using an auxiliary tool, and to secure the guard (20) in any rotation position, the clamp (23) is secured to the collar (15) in a rotating fashion and a manually releasable locking mechanism is provided between the clamp (23) and the collar (15) (FIG. 1).

11 Claims, 4 Drawing Sheets

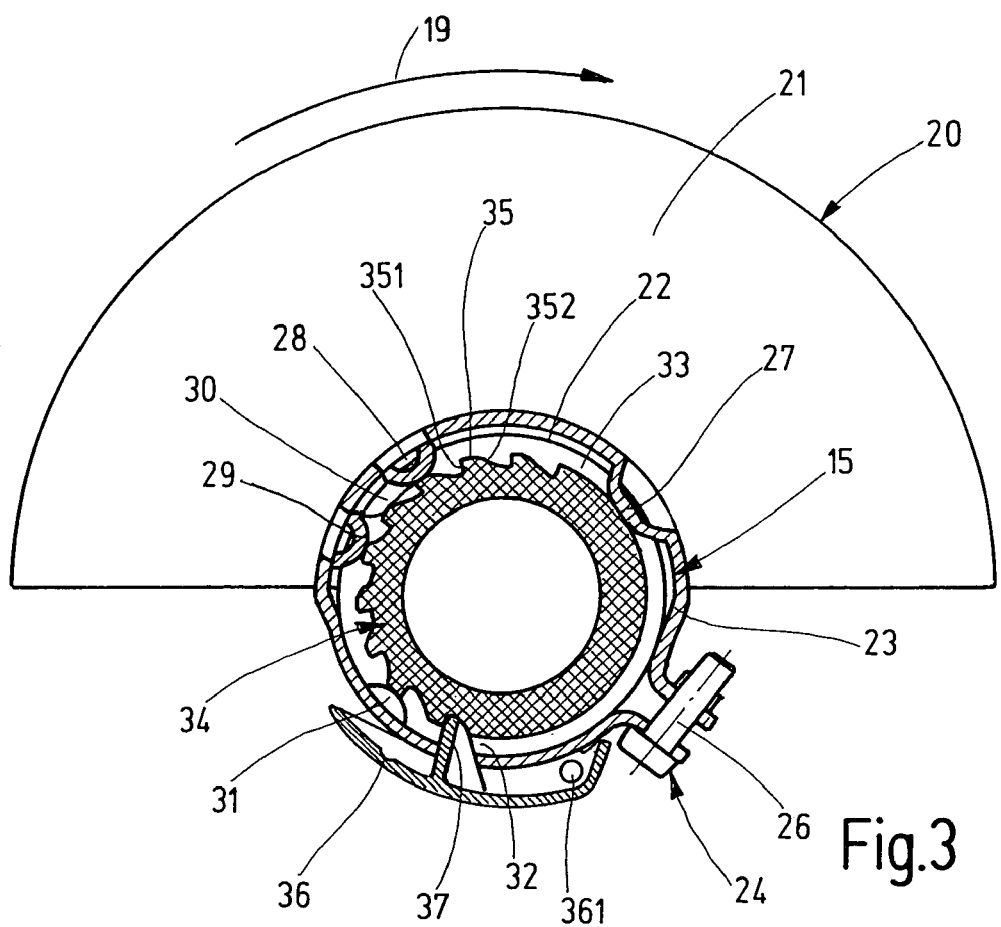
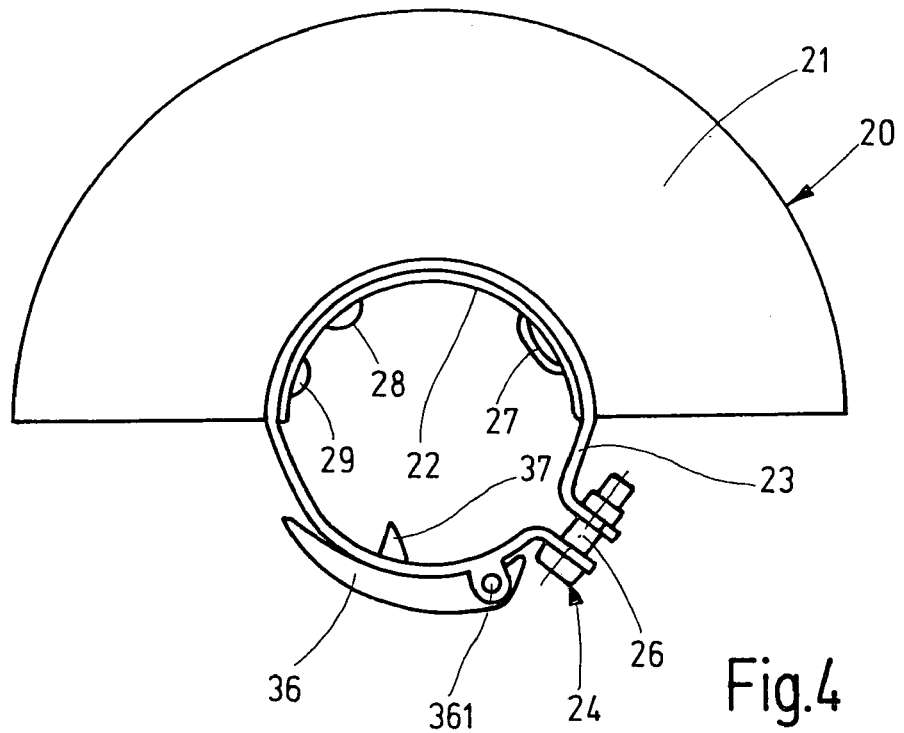

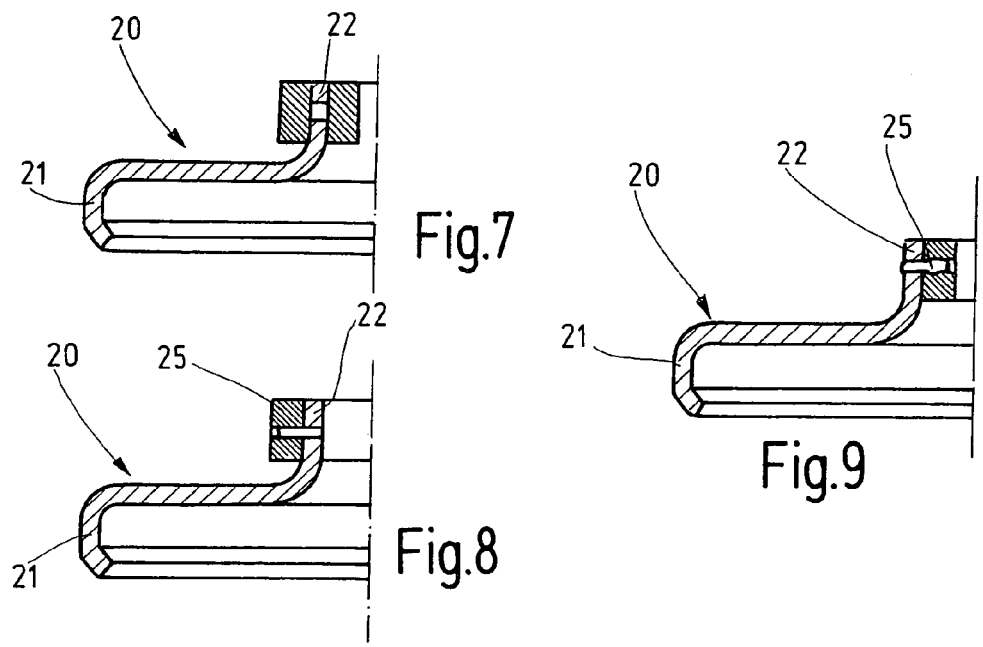
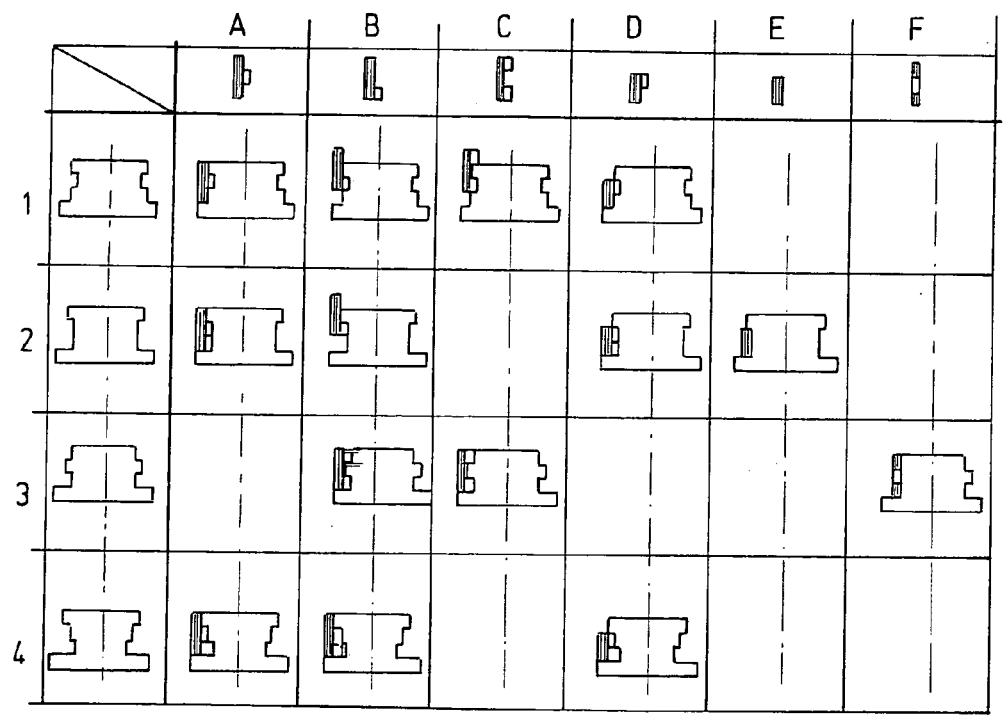

ELECTRIC PORTABLE POWER TOOL WITH ROTATABLE GUARD

CROSS-REFERENCE

The invention described and claimed hereinbelow is also described in PCT/DE 03/03625, filed Oct. 31, 2003 and DE 102 59 520.8, filed Dec. 19, 2002. This German Patent Application, whose subject matter is incorporated here by reference, provides the basis for a claim of priority of invention under 35 U.S.C 119 (a)–(d).

BACKGROUND OF THE INVENTION

The present invention is based on a manually operated electric machine tool for a disk-shaped, rotating tool.

In manually operated electric machine tools of this kind, the purpose of the guard is to protect the user from sparks and material particles that are hurled outward from the rotating tool, e.g. a grinding wheel or cutting wheel, during operation. The guard should also protect the user in the event that the tool breaks. For example, when a cutting wheel jams in the work piece, the cutting wheel can shatter. In this case, the guard must prevent fragments of the shattered cutting wheel from coming near the user. Since the guard generally only covers an angular range of 180° of the rotating tool, in order to assure a sufficient degree of protection in various work applications of the manually operated electric machine tool in which the machine is used differently, the guard is designed to be rotationally adjustable. In order to be able to rotate the guard into the desired region, the clamping element, which is usually embodied in the form of a clamping screw, must first be loosened by means of an auxiliary assembly tool, e.g. a screwdriver, and then the guard is set in the desired position by tightening the clamping screw again so that even if the rotating tool breaks, the guard cannot rotate on the collar in reaction to the pressure exerted by the parts of the tool being hurled outward. Adjusting the guard by loosening and tightening the clamping screw with the required auxiliary tool is not only troublesome so that the procedure of adjusting the guard to the proper working position is often omitted, but also, over the long term, subjects the clamping screw to wear so that the guard can no longer be fixed to the collar with a sufficient degree of reliability and no longer assures sufficient protection of the operator if a tool shatters.

SUMMARY OF THE INVENTION

The manually operated machine tool according to the present invention has the advantage that selling the correct rotation position of the guard in relation to the housing does not require an auxiliary tool. The clamping element is only used in the initial installation of the guard to produce a rotating attachment of the clamp to the collar of the machine housing. The integrated, manually releasable locking mechanism on the one hand permits the guard to be rotated into any number of rotation positions and on the other hand prevents the guard from rotating when it is struck by parts hurled from a shattered tool. If frequent adjustment of the guard causes wear to occur on the collar or clamp, then this can be compensated for by resetting or readjusting the clamping element. This advantageously permits the guard to be used in manually operated electric machine tools with collars made of plastic.

According to an advantageous embodiment form of the present invention, the manually releasable locking mechanism between the clamp on the guard and the collar of the machine housing has a toothed section on the collar and a ratchet on the clamp that engages with the toothed section by means of spring force. The ratchet is designed so that if the rotating tool shatters, a self-locking occurs, i.e. the ratchet is pulled deeper into the teeth so that the locking mechanism cannot release.

According to an advantageous embodiment form of the present invention, the toothed section has sawtooth-shaped teeth with steeply sloped tooth flanks and shallowly sloped tooth backs; the teeth are arranged one after another so that the tooth flanks point in a direction counter to the rotation direction of the tool.

According to an advantageous embodiment form of the present invention, the ratchet is provided on a spring-loaded hand lever that is disposed on the outside of the clamp and can be pivoted around a pivot axis parallel to the clamp axis. When the hand lever is pivoted away from the clamp counter to the return force of the spring, this releases the locking mechanism and the guard can be rotated on the collar in both rotation directions.

According to an alternative embodiment form of the present invention, the ratchet is provided at the front end of a spring tab that is attached to the clamp and is oriented in the rotation direction of the tool. The clamp is preferably made of spring steel and the clamp is cut out from the spring tab. In this case, the guard can be adjusted through a simple manual rotation, but only in one rotation direction that is oriented counter to the rotation direction of the tool.

According to an advantageous embodiment form of the present invention, a circumferential groove/spring connection between the clamp and collar rotationally secures the clamp to the collar.

According to a preferred embodiment form of the present invention, the groove/spring connection has at least one circumferential annular groove that is let into the outer surface of the collar and at least one cam that protrudes radially from the inner surface of the clamp and engages in the annular groove. The toothed section for rotationally securing the guard to the machine housing is advantageously embodied at the groove bottom of the annular groove and preferably extends over a rotational angle of 180°.

According to an advantageous embodiment form of the present invention, the outer circumference of the collar is provided with at least one axial groove that runs into the annular groove at one end and at the other end, opens out at the free end surface of the collar. This at least one axial groove is associated with the at least one cam in the clamp, which cam can travel into the axial groove from the free end surface of the collar. The number, position, and geometry of the cam(s) can be used to produce a coding so as to prevent the guard from being used on manually operated electric machine tools that have the same housing, but are of a different type, e.g. one that runs at a higher operating speed.

DRAWINGS

BRIEF DESCRIPTION OF THE DRAWINGS

FIG. 3 is a section along the line III—III in FIG. 1, FIG. 4 is a top view of the guard in FIGS. 1 to 3, FIG. 10 shows a matrix of different geometric embodiments of the collar and the clamp for rotationally securing the clamp to the collar.

DETAILED DESCRIPTION OF THE PREFERRED EMBODIMENTS

Figure 1:
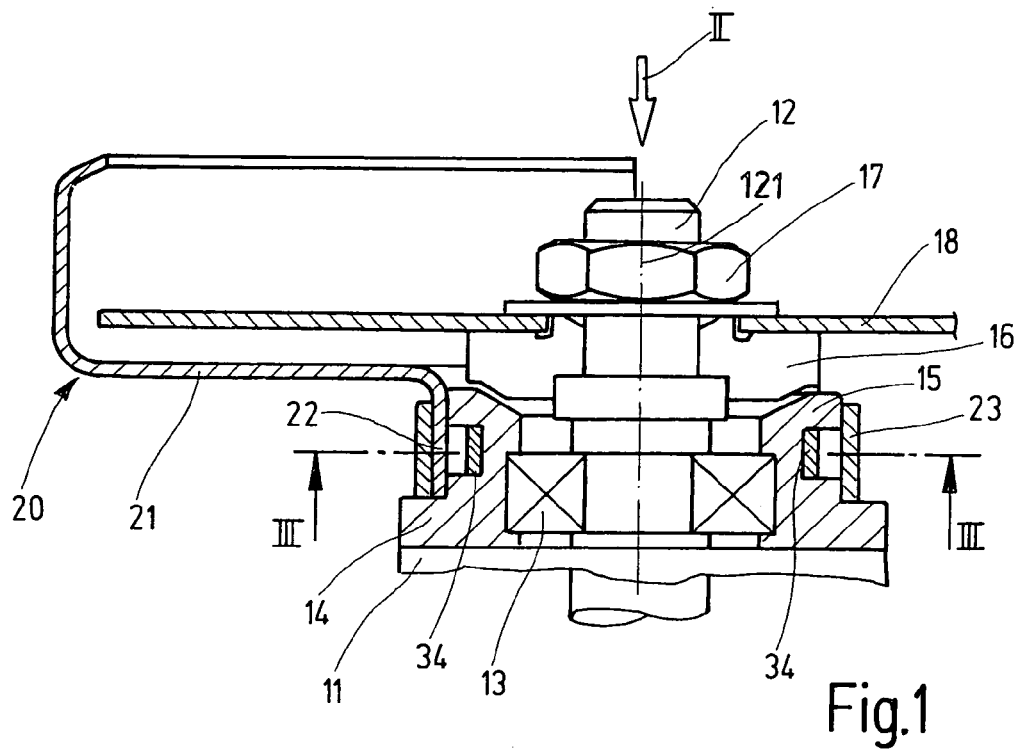
FIG. 1 shows a longitudinal section through a detail of a manually operated electric machine tool with a guard attached to it.

The angle grinder, which is depicted in a longitudinally sectional detail view in FIG. 1 as an exemplary embodiment for a generic manually operated electric machine tool with a disk-shaped rotating tool, has a machine housing 11 that contains an electric motor that drives a drive spindle 12 protruding from the machine housing 11 and connected to the motor via a transmission. Close to the point at which it exits the machine housing 11, the drive spindle 12 is supported in rotary fashion by means of a radial bearing 13 in a housing flange 14 on which a hollow, cylindrical collar 15 is embodied, which is coaxial to the axis 121 of the drive spindle 12. The drive spindle 12 supports a socket flange 16 that is secured to it in a rotationally fixed manner, to which a grinding or cutting wheel 18—as an exemplary embodiment for a generic disk-shaped, rotating tool—can be clamped by means of a threaded nut 17. In order to protect the operator, the grinding or cutting wheel 18 is covered over a circumference of 180° by a guard 20 that is attached to the machine housing 11 before the grinding or cutting wheel 18 is mounted and can rotate in relation to this machine housing over a rotation angle range that the operator adapts to the attitude of the machine.

Figure 2:
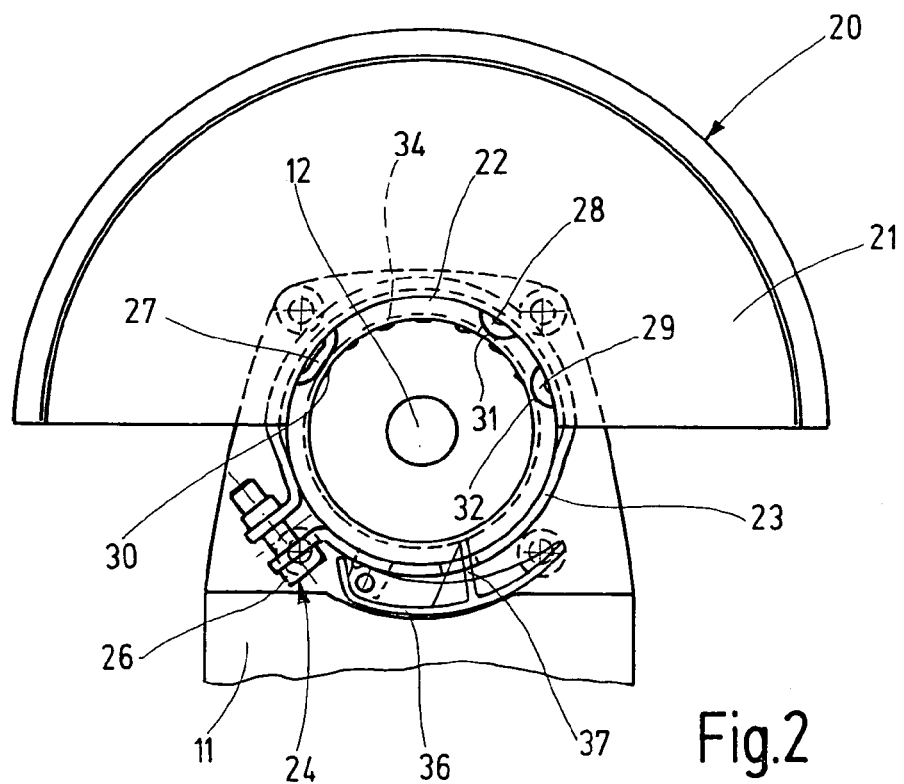
FIG. 2 is a top view in the direction of the arrow II in FIG. 1, with the guard rotated into the mounting position.

The guard 20, which is shown in a top view in FIG. 4 and is shown in various views and sections in FIGS. 1 to 3 in connection with the machine housing 11, has a guard body 21, which covers the grinding or cutting wheel 18 over approximately 180° of its circumference angle, and a semicircular flange 22, which is formed onto the guard body 21 concentric to it and protrudes axially from the guard body 21, as well as a clamp 23 with a clamping element 24 that is fastened to the flange 22. The guard body 21 with the flange 22 is preferably manufactured out of plate steel, but can also be made of plastic or a glass fiber composite. The clamp 23 is made of plastic or is manufactured as a bent sheet metal part. The plastic clamp 23, as depicted in FIG. 7, is attached to the flange 22 by being molded onto it. The steel clamp 23 is fastened to the flange 22 by means of screws, rivets, or welds; the clamp 23—as depicted in FIG. 8—encompasses the flange 22 or—as depicted in FIG. 9—is encompassed by the flange 22. FIGS. 8 and 9 each show a riveted connection between flange 22 and the clamp 23. The rivet is labeled with the reference numeral 25.

The clamp 23 is comprised of several parts, the ends at the split being bent into radially protruding tabs that are connected to each other by the clamping element 24, which is embodied in the form of an adjusting screw 26. On the inner surface of the clamp 23, three cams 27, 28, 29 are provided spaced apart from one another in the circumference direction, each corresponding to one of three axial grooves 30, 31, 32, which are let into the collar 15 spaced the same distances apart as the cams (FIGS. 2 and 3). At one end, the axial grooves 30, 31, 32 run into to an annular groove 33 that is let into the outer surface of the collar 15 and at the other end, they open out at the free end of the collar 15. In order to mount the guard 20 onto the collar 15, the guard 20 must be brought into a rotation position in which the cams 27–29 coincide with the axial grooves 30–32. Then the guard 20 is slid axially onto the collar 15 until the cams 27 travel into the annular groove 33. The adjusting screw 26 is then tightened until the collar 15 supports the clamp 23 without play, but in a rotating fashion. The cams 27–29 and the annular groove 33 produce a groove/spring connection that prevents the guard 20 from being removed from the collar 15 in the axial direction except when it is in the rotation position in which the cams 27–29 are aligned in the axial direction with the axial grooves 30–32. The form, number, and position of the cams 27–29 can be used to produce a coding so that certain guard designs can only be mounted onto certain manually operated electric machine tools. A single cam is sufficient to produce a simple coding for a few combinations of manually operated electric machine tools and guards.

In order to fix the guard 20, which is supported in rotary fashion on the collar 15 of the machine housing 11, in a rotation position in relation to the machine housing 11 required for a desired working position, a manually releasable locking mechanism between the collar 15 and the clamp 23 is provided, which can lock the guard 20 in a number of definite relative rotation positions in relation to the collar 15. As is clear from the sectional depiction in FIG. 3, a toothed section 34 is provided for this purpose at the groove bottom of the annular groove 33, extending over approximately 180° of circumference angle of the annular groove 33. The toothed section 34 has a number of sawtooth-shaped teeth 35 situated one after another, each of which has a steeply sloped tooth flank 351 and a tooth back 352 sloping shallowly away to the tooth flank 351 of the next tooth 35. The teeth 35 are arranged so that the tooth flanks 351 point in a rotation direction counter to the rotation direction 19 of the grinding or cutting wheel 18. The outside of the clamp 23 has a pivoting, spring-loaded hand lever 36 whose pivot axis 361 extends parallel to the guard axis. Spaced apart from the pivot axis 361, a ratchet 37 protrudes approximately radially inward from the hand lever 36, through an opening in the clamp 23, and into the annular groove 33 in the collar 15, cooperating with the toothed section 34 therein in order to lock the guard 20 in place. After the guard 20 is mounted onto the collar 15 in the manner described above, in the mounting position in which the cams 27–29 are aligned with the axial grooves 30–32 (FIG. 2), the guard 20 is rotated and the ratchet 37 engages with the first tooth 35 of the toothed section 34, as depicted in FIG. 3. The locking occurs due to a spring force acting in the radial direction; the spring that acts on the hand lever 36 is not shown in FIGS. 3 and 4. If another rotation position of the guard 20 is desired, then the hand lever 36 must be pivoted slightly away from the clamp 23 until the ratchet 37 lifts out from the toothed section 34. The guard 20 can then be rotated as desired in both rotation directions. As soon as the hand lever 36 is released again, the stressed spring presses the ratchet 37 back into the teeth and the guard 20 is securely locked in the new rotation position. The resulting locking of the guard 20 acts in the rotation direction of the grinding or cutting wheel 18, thus securely preventing the guard 20 from rotating in the event that the tool shatters.

Figure 5:
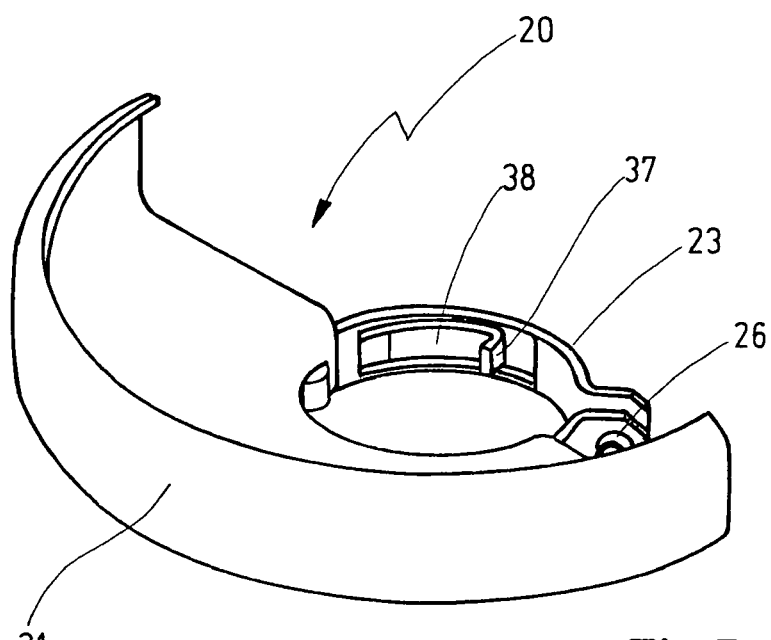
FIG. 5 is a perspective view of a modified guard for use on the manually operated electric machine tool according to FIG. 1.
Figure 6:
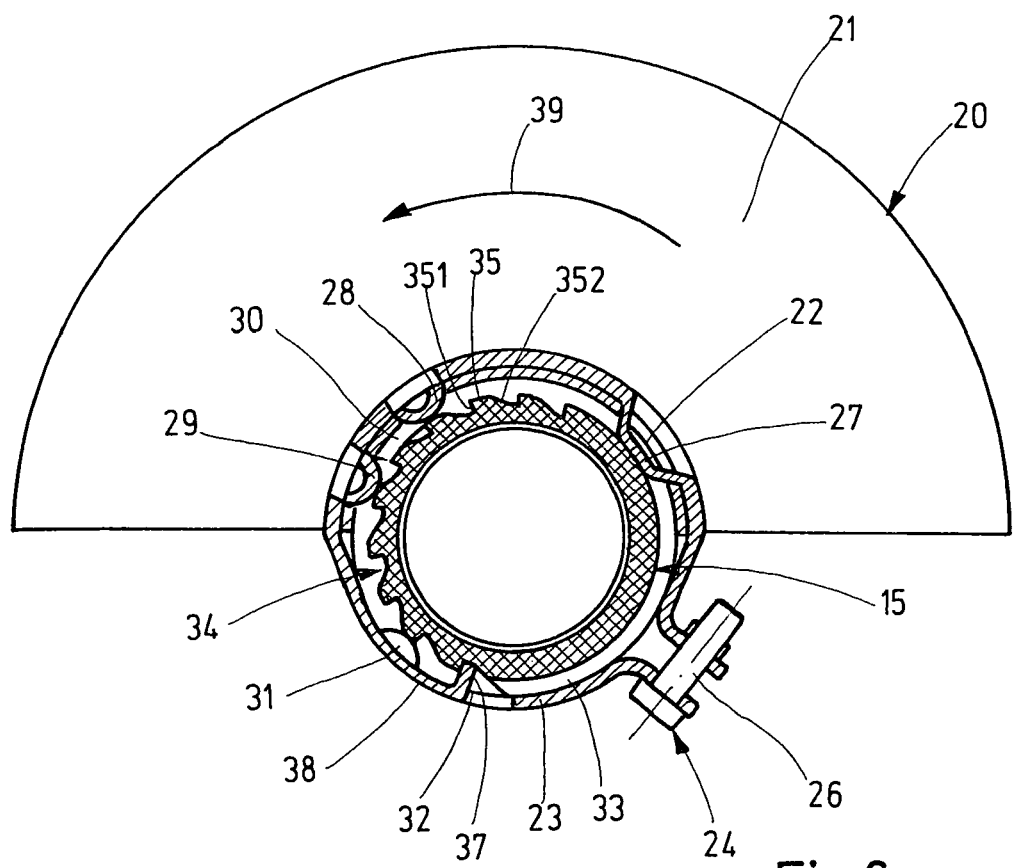
FIG. 6 shows the same view as in FIG. 3 of the guard according to FIG. 5 mounted to the manually operated electric machine tool, FIGS. 7 to 9 each show a half section of a guard according to three exemplary embodiments.

In the modified guard 20 shown in FIG. 5 and shown in connection with the collar 15 of the machine housing 11 in FIG. 6, the ratchet 37 is affixed to the front end of a spring tab 38 oriented in the rotation direction of the grinding or cutting wheel 18; the spring tab 38 is in turn affixed to the clamp 23. The spring tab 38 is preferably cut out from the clamp 23, which is manufactured of spring steel for this purpose. The inwardly directed prestressing of the spring tab 38 presses the ratchet 37 into the toothed section 34. The ratchet 37 rests against the steeply sloped tooth flank 351 of a tooth 35, thus reliably preventing the guard 20 from being rotated along with parts hurled outward from the grinding or cutting wheel 18 in the event that it shatters. In this instance, the guard 20 can naturally only be rotated in the arrow direction 39 in FIG. 6, i.e. counter to the rotation direction 19 of the grinding or cutting wheel 18, in order to bring it into another desired rotation position.

In both of the above-described exemplary embodiments of the manually operated electric machine tool with a guard 20, in order to secure the guard 20 to the collar 15 of the machine housing 11 in rotary fashion, i.e. to prevent the guard 20 from coming off of the collar 15 in the axial direction, the cams 27–29 are provided on the inside of the clamp 23 and the annular groove 33 in which the cams 27–29 engage is provided in the middle of the collar 15 (FIG. 1). There are, however, other possible geometries for the clamp and collar that can produce this rotational securing of the guard 20. FIG. 10 shows a matrix for this purpose in which the rows X each show a partial section through the clamp 23 with a different cam arrangement and the columns Y show different geometric embodiments of one or more annular grooves 33 in the collar 36. The combination of the clamping element variants A–F with the collar variants 1—4 produces the different associations of annular grooves and cams shown in the matrix, all of which produce a reliable rotational securing of the guard 20 to the collar 15. Since the pictures are self-explanatory, they are not described in greater detail and are merely referred to in relation to a few examples.

For example, with the collar geometry shown in line 2 of the matrix, the axial width of the annular groove is greater than the axial width of the associated cam and the groove bottom has a constant diameter. The axial position of the cam is selected so that the cam rests against the annular groove wall closest to the end surface of the collar (matrix combinations A/2, B/2, and D/2).

In another exemplary embodiment, the groove bottom of the annular groove is provided with a stepped diameter (collar geometry line 1). If the clamp has the cam geometry according to A or B, then this produces an association of the clamp and the collar according to the combinations A/1, B/1, and D/1. If cams are provided in parallel rows on the clamp (cam geometry column C), then with the stepped embodiment of the groove bottom (collar geometry line 1), this produces the association of clamp and collar shown in C/1.

In the exemplary embodiment of the clamp in column E, the provision of a cam has been omitted. The clamp itself constitutes the spring of the groove/spring connection between the clamp and the collar; the annular groove is embodied with a groove width that corresponds to the clamp.

The clamp outlined in column F in combination with the collar geometry in line 3 produces the groove/spring connection between the clamp and collar by switching the positions of the groove and spring. The clamp has a recess in the middle that constitutes the groove and extends for example over 180°. The collar is provided with a corresponding annular rib that protrudes into the recess.

What is claimed is:

1. A manually operated electric machine tool for a disk-shaped rotating tool (18), comprising:

a machine housing (11), wherein a drive spindle (12) for the tool (18) protrudes from the machine housing (11);

a guard (20) that is detachably connected to the machine housing (11) and is designed to at least partially cover the tool (18), wherein said guard has a clamp (23) with a clamping element (24); and a hollow cylindrical collar (15), wherein said collar is provided on the machine housing (11) and is coaxial to the drive spindle (12), the clamp (23) permitting the guard (20) to be mounted onto the collar and fixed in relation to the collar it, wherein the clamp (23) is secured to the collar (15) in a rotating fashion and a manually releasable locking mechanism between the clamp (23) and the collar (15) is designed so as to permit the guard (20) to be locked in a number of definite relative rotational positions in relation to the collar (15), wherein the manually releasable locking mechanism has a toothed section (34) provided on the collar (15) and a ratchet (37) that is provided on the clamp (23) and is pressed into the toothed section (34) by means of spring force, and wherein the ratchet (37) is embodied on a soring-loaded hand lever (36) that is provided on the outside of the clamp (23) and is able to pivot around a pivot axis (361) parallel to a clamp axis.

2. The manually operated electric machine tool as recited in claim 1, wherein the toothed section (34) has sawtooth-shaped teeth (35) with steeply sloped tooth flanks (351) and shallowly sloped tooth backs (352), and wherein the teeth (35) are situated one after another so that the tooth flanks (351) are oriented in a direction counter to a rotation direction (19) of the tool (18).

3. The manually operated electric machine tool as recited in claim 1, wherein the ratchet (37) is embodied at the front end of a spring tab (38) oriented in the rotation direction (19) of the tool (18), wherein the spring tab (38) is affixed to the clamp (23) and is cut out from the spring steel plate from which the clamp (23) is manufactured.

4. The manually operated electric machine tool as recited in claim 1, wherein a circumferential groove/spring connection is produced between the clamp (23) and collar (15) in order to rotationally secure the clamp (23) to the collar (15).

5. The manually operated electric machine tool as recited in claim 4, wherein the groove/spring connection has at least one annular groove (33) that is provided in an outer surface of the collar (15) and at least one cam (27–29) that protrudes radially from an inner surface of the clamp (23) and engages in the annular groove (33), and wherein the toothed section (34) provided at a bottom of the annular groove (33) extends over a circumference angle of the annular groove of 180°.

6. The manually operated electric machine tool as recited in claim 5, wherein an outer circumference of the collar (15) has at least one axial groove (30–32) that runs into the annular groove (33) at one end and at the other end, opens out at the free end surface of the collar (15) and is associated with the at least one cam (27–29) on the clamp (23).

7. The manually operated electric machine tool as recited in claim 1, wherein the clamp (23) is fastened to a semicircular, axially protruding flange (22) of the guard (20) by being molded onto it, being welded to it, or by means of screws or rivets.

8. A guard for a manually operated electric machine tool, comprising:

a collar (15) that encompasses a drive spindle (12) for a disk-shaped rotating tool (18);

a clamp (23) designed to slide onto the collar (15); and a clamping element (24) that is provided on the clamp (23) for affixing the clamp (23) to the collar (15), wherein the clamp (23) is provided with a locking element for detachably locking the guard (20) in discrete relative rotational positions in relation to the collar (15), and wherein the clamp (23) has at least one cam (27–29) protruding radially from an inner surface, wherein the at least one cam is designed to engage in an annular groove (33) provided in the collar (15) of the manually operated electric machine tool.

9. The guard as recited in claim 8, wherein the locking element is a ratchet (37) that is designed to engage in a spring-loaded fashion with teeth (34) on the collar (15).

10. The guard as recited in claim 9. wherein the ratchet (37) is embodied on a spring-loaded hand lever (36) that is provided on an outside of the clamp (23) and is able to pivot around a pivot axis (361) parallel to a clamp axis.

11. The guard as recited in claim 9, wherein the ratchet (37) is fastened to one end of a spring tab (38) attached to the clamp (23) and is cut out from the spring steel from which the clamp (23) is manufactured.

* * * * *